United States Patent
Gunasekara

(10) Patent No.: US 8,054,960 B1
(45) Date of Patent: Nov. 8, 2011

(54) METHOD AND SYSTEM FOR SETTING UP A RINGBACK MEDIA SESSION

(75) Inventor: Don Gunasekara, Reston, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 1371 days.

(21) Appl. No.: 11/593,220

(22) Filed: Nov. 6, 2006

(51) Int. Cl.
- H04M 3/42 (2006.01)
- H04L 12/16 (2006.01)
- H04L 12/66 (2006.01)

(52) U.S. Cl. .............. 379/201.12; 370/259; 370/352; 370/356; 379/211.02; 379/257; 455/414.1

(58) Field of Classification Search .............. 370/259, 370/352–356; 379/201.01, 201.02, 201.12, 379/207.16, 372, 373.01–373.04, 374.01, 379/211.02, 257; 455/414.1, 567
See application file for complete search history.

(56) References Cited

U.S. PATENT DOCUMENTS

| | | |
|---|---|---|
| 7,006,608 B2 | 2/2006 | Seelig et al. |
| 2003/0002657 A1 | 1/2003 | Seelig et al. |
| 2003/0086558 A1 | 5/2003 | Seelig et al. |
| 2008/0037740 A1 * | 2/2008 | Yoakum et al. .......... 379/142.01 |

OTHER PUBLICATIONS

Keith Byerly, "Next-Generation Media Processing for Packet Networks," Brooktrout Technology White Paper (Sep. 2004).
"Convedia Expands IP Media Server Control Options with Addition of IMS-Compliant H.248 Interface," Feb. 13, 2006, http://www.convedia.com/news_and_events/press_releases/press_2006/060213_H248.html.
"Telenity Adds Video Services to its Canvas Solutions," Jul. 6, 2006, http://www.kensei-news.com/cetc/publish/wireless/article_38605.shtml.

* cited by examiner

Primary Examiner — Harry Hong

(57) ABSTRACT

A method and apparatus for setting up a ringback media session between a calling party and a ringback server. A signaling proxy may receive a call setup message seeking to set up a call from the calling party to a called party and responsively forward the call setup message from the signaling proxy to the called party. Thereafter, the signaling proxy may receive from the called party a reply to the call setup message indicating that the call is not yet answered by the called party. In response, the signaling proxy may send a call-forwarding initiation message to the ringback server to initiate forwarding of the call to the ringback server and setup of a ringback media session between the ringback server and the calling party. That message may include a designation of particular media that the ringback server should provide to the calling party, based on subscriber profile data.

20 Claims, 4 Drawing Sheets

METHOD AND SYSTEM FOR SETTING UP A RINGBACK MEDIA SESSION

FIELD OF THE INVENTION

The present invention relates to telecommunications and, more particularly, to establishment of communication for playing out ringback media to a calling party.

BACKGROUND

In a traditional telephone network, ringback is typically an audible tone sequence presented to a caller to signal that the called party's phone is being alerted of the caller's incoming call to the called party. Upon hearing ringback, the caller may generally assume that the called party is receiving a corresponding, concurrent (or nearly concurrent) alert, such as an audible ringtone sequence. The ringback usually continues until either the called party (or a call-handling function, such an answering machine) answers the call or the caller hangs up before the call is answered.

The model for ringback has evolved similarly in both circuit-switched telephony with out-of-band signaling and services (Signaling System 7 (SS7) and Advanced Intelligent Network (AIN), for example), and packet-based telephony, such as Voice over Internet Protocol (VoIP).

Ringback tone in these types of systems is typically stored as an audio data file on a network entity, such as a network server, and played out to a caller's phone during call setup when the entity receives a signal, from a called switch for example, indicating that the called party's phone is being alerted.

The server-based model of ringback tone storage/playout can support multiple ringback tones, and lends itself to a variety of schemes for customization of ringback tones. An example of customization of ringback tone is a user feature that allows a subscriber in a carrier or service provider network to select one or more ringback tones that will be presented to callers to that user. The carrier or service provider may in turn charge a fee to the subscriber for access to the feature.

In recent years, basic techniques for setting up and connecting VoIP calls have also advanced substantially. As a general matter, a signaling protocol such as the well known Session Initiation Protocol (SIP) will be used to exchange signaling messages between calling and called parties, so as to set up a VoIP call between the parties. For instance, when the calling party dials the telephone number of a called party, the calling party's VoIP phone may generate and send over an IP network to the called party's phone a SIP "INVITE" message that requests setup of a media session between the phones. The SIP INVITE message designates the IP address of calling party's phone and describes one or more attributes of the desired session, such as voice coding scheme to be used and so forth.

Upon receipt of the SIP INVITE message, the called party's phone may then ring to alert the called party of the call. Possibly in response to the called party answering the call, the called party's phone may then generate and send over the IP network to the calling party's phone a SIP "200 OK" message that indicates acceptance of the requested session. The SIP 200 OK message similarly designates the IP address of the called party's phone and describes any alternative proposed attributes of the call session.

Upon receipt of the SIP 200 OK message, the calling party's phone then generates and sends to the called party's phone a SIP "ACK" message, which acknowledges setup of the session. The calling and called parties may then proceed to exchange packets representing voice or other bearer data in the agreed manner, i.e., the call may proceed.

One significant advance in this regard is the introduction of an enhanced proxy system now well known as the "IP Multimedia Subsystem" or "IMS." With IMS, the IP network will include at least one "Call Session Control Function" (CSCF), which functions as an enhanced signaling proxy through which SIP signaling flows, and which can act upon or in response to the SIP signaling in order to provide or facilitate various services. One CSCF (referred to as a calling CSCF (O-CSCF) or a proxy CSCF (P-CSCF)), may serve a calling party, while another CSCF (referred to as a called CSCF (T-CSCF) or a serving CSCF (S-CSCF)), may serve a called party. Further, the network may include at least one "Home Subscriber Server" (HSS), which is a profile database that contains service profile data for various subscribers, such as data indicating for a particular call what services and service attributes apply to a given calling party and to a given called party. In addition, the network may include various application servers that are arranged to carry out special services or functions.

In practice, when a device sends a SIP INVITE message, the message will pass to a CSCF. The CSCF may then query the HSS to determine whether particular applications should be invoked, based on the profile of either or both parties to the SIP signaling exchange. According to this determination, the CSCF may then send the SIP INVITE to a particular application server (designated by the HSS for instance), and the application server may then operate on or in response to the SIP INVITE in some manner and send the SIP INVITE back to the CSCF, and the CSCF may then send the SIP INVITE along to its destination.

An example application of such IMS signaling is to facilitate pre-paid or other account balance tracking for VoIP calling. When a party seeks to set up a VoIP call by sending a SIP INVITE to a called party, a CSCF may shunt that SIP INVITE to an account balance server, and the account balance server may confirm (by reference to the HSS for instance) that the calling party has sufficient balance to proceed with the call and, if so, may pass the SIP INVITE back to the CSCF, and the CSCF may pass the SIP INVITE along to its destination. When SIP 200 OK and SIP ACK messages flow in turn between the calling and called parties, the CSCF may then further signal to the account balance server, to allow the account balance server to begin decrementing the calling party's account balance. And when the call ends (as a SIP "BYE" message flows from one party to the other, for instance), the CSCF may similarly signal to the account balance server, to allow the account balance server to stop decrementing the calling party's account balance and update the balance record accordingly. Many other examples of IMS signaling are possible as well.

In other situations, the CSCF itself may itself apply enhanced services when faced with SIP signaling, regardless of whether the CSCF also requests the assistance of an application server. For instance, when the CSCF receives a SIP INVITE destined to a particular party, the CSCF may query the HSS and thereby determine that the called party has a call-forwarding function set to indicate that calls to the called party should be forwarded to a designated third party. In response, the CSCF may then convert the SIP INVITE into a SIP 181 call-forwarding initiation message and send the SIP 181 message to the third party's device, instead of setting up the call to the originally called party. Upon receipt of such a message, the third party's device may then respond with a SIP 200 OK indicating acceptance of the forwarded call (possibly in response to a the third party answering the call), and that SIP 200 OK would flow through the CSCF to the calling party. In turn, the calling party may send a SIP ACK via the CSCF to the third party, so as to complete setup of the forwarded call, and the calling party and third party may begin communicating.

One additional function that can be carried out by a CSCF or other IMS elements (e.g., a Service Capability Interaction Management (SCIM) function) is to verify the availability of, and reserve, any access-network bandwidth necessary for a device to engage in a requested communication session (such as a VoIP session for instance). Where a party's device communicates via a cellular wireless network, for instance, the device may be served by a Packet Data Serving Node (PDSN) and a Radio Access Network (RAN). When session setup signaling passes through IMS, the CSCF, SCIM, or other IMS entity may further engage in signaling with the PDSN or RAN (or with a Policy Decision Function (PDF) that in turn communicates with a Policy Enforcement Point (PEP) such as the PDSN) to determine whether the bandwidth necessary for the requested session is available and, if so, to reserve the bandwidth.

SUMMARY

The present invention provides an innovative method and system for setting up a ringback media session between a calling party and a ringback server. The invention is particularly well suited for use within an IMS architecture, and where SIP signaling is used for the call setup. However, the invention may apply in other scenarios as well, including but not limited to legacy circuit-switched call setup scenarios such as those involving advanced intelligent call processing and the like.

According to an example of the invention, a signaling proxy (such as a CSCF for instance) will receive a call setup message (such as a SIP INVITE message) that seeks to set up a call from a calling party to a called party, and the signaling proxy will forward the call setup message to the called party. Thereafter, the signaling proxy will then receive from the called party a reply to the call setup message that indicates the call is not yet answered by the called party but is, for instance, ringing or busy. In SIP, such a reply message may take various forms, examples of which include a SIP 480 ("temporarily unavailable") message, a SIP 486 ("busy here") message, a SIP 100 ("trying") message, and a SIP 180 ("ringing") message.

In response to receiving the reply indicating that the call is not yet answered by the called party, the signaling proxy will then make innovative use of traditional call forwarding. In particular, the signaling proxy will forward the call to a ringback server to establish a ringback session between the ringback server and the calling party.

To do so with SIP, the signaling proxy may treat the ringback server much like any third party to which a call should be forwarded. Thus, based on the SIP INVITE message that had passed through the CSCF, the signaling proxy may generate and send a SIP 181 (call-forwarding initiation) message to the ringback server in the same manner described above for a third party to which calls are to be forwarded. Further, the CSCF may include in the SIP 181 a Session Description Protocol (SDP) header parameter that functions (in a way the ringback server is programmed to understand) as a directive for invoking ringback service. The ringback server may then respond with a SIP 200 OK message to the calling party, accepting the call-forwarding initiation request. And the calling party may in turn send a SIP ACK message to the ringback server to complete setup of a ringback media session between the ringback server and the calling party.

In a preferred embodiment, the CSCF may query the called party's profile (and/or the calling party's profile) in an HSS to determine whether to invoke this special ringback service. Further, if the decision is to invoke the ringback, the CSCF may further determine from the HSS what ringback media the ringback server should play out to the calling party, and the CSCF may include a designation of that ringback media within the SIP 181 message that the CSCF sends to the ringback server.

For instance, the calling party's profile or called party's profile may indicate that a particular video, song, speech, news item, or the like should be played to the calling party as ringback, so the CSCF may include a designation of that particular media (e.g., by media-ID number) in a parameter of the SIP 181 message. Alternatively, the calling party's profile or called party's profile may indicate that a particular category of media, such as voice, video, news, or a specific genre in one of those or other media type, should be played to the calling party as ringback, and the CSCF may include a designation of that media category in a parameter of the SIP 181 message. When the ringback server receives the SIP 181 message, it may then read that designation from the message and thereby determine what media to play as ringback to the caller once the ringback session is formally set up. If the designation is a category, the ringback server may select media from the category randomly or in other any manner desired.

It should be understood that the present invention is focused principally on establishing, or facilitating establishment of, a ringback session between a ringback server and a calling party. As such, the invention may or may not further involve the actual communication of the ringback media or other procedures that may be applied to discontinue playout of the ringback media if and when the called party (or voice mail or another entity acting on behalf of the called party) answers the call. As an extension, in that regard, when the called party (or other entity) answers the call, a SIP signaling message may pass back to the CSCF, and the CSCF may responsively (i) signal to the ringback server to discontinue the ringback media session between the ringback server and the calling party and (ii) proxy further session setup signaling, such as a SIP 200 OK message and a SIP ACK message, between the calling and called parties, so as to complete setup of the originally requested call. Thereafter, the parties may then communicate with each other.

In summary, in accordance with one respect, an exemplary embodiment of the invention may take the form of a method for setting up a ringback session between a ringback server and a calling party. Such a method may involve (a) receiving into a signaling proxy a call setup message seeking to set up a call from the calling party to a called party, (b) responsively forwarding the call setup message from the signaling proxy to the called party, (c) thereafter receiving into the signaling proxy from the called party a reply to the call setup message, the reply indicating that the call is not yet answered by the called party, and (d) responsive to the reply, sending from the signaling proxy to the ringback server a call-forwarding initiation message to initiate forwarding of the call to the ringback server and setup of a ringback media session between the ringback server and the calling party.

As noted above, the signaling proxy may comprise a CSCF. Further, the calling party may comprise a cellular wireless communication device such as a VoIP-capable cell phone, and the called party may similarly comprise a cellular wireless communication device such as a VoIP-capable cell phone. (In an alternative embodiment, either or both parties can be legacy circuit-switched devices such as plain old telephones or cell phones that are not equipped to engage in VoIP communication. In that instance, an entity such as a media gateway or media terminal adapter can act on behalf of the party to engage in the sort of signaling and communication described herein, and the entity can extend the signaling and communication to the party over a legacy connection.) Advantageously, if the signaling proxy comprises a CSCF, the signaling proxy can also work with a PDSN serving either party, to ensure availability of suitable bandwidth for the ringback session and to reserve that bandwidth for the ringback session.

As further noted above, the call setup message may comprise a SIP INVITE message, and the reply message may comprise a SIP 480 message or a SIP 486 message, among other possibilities. Further, the call-forwarding initiation message may comprise a SIP 181 message and may include at least one parameter that requests the ringback server to initiate ringback playout as well as at least one parameter that specifies particular media, or a particular category of media, to play to the calling party, as determined by querying subscriber profile data for instance. Still further, the signaling proxy may condition this invocation of ringback service on calling and/or called party profile data indicating that the ringback service should be invoked, such that the signaling proxy should initiate forwarding of the call to the ringback server.

As yet further noted above, after the signaling proxy sends the call-forwarding initiation message to the ringback server, the method may then involve (e) receiving into the signaling proxy from the ringback server a call-forwarding reply message, and passing the call-forwarding reply message from the signaling proxy along to the calling party, and (f) thereafter receiving into the signaling proxy from the ringback server a call-forwarding acknowledgement message, and passing the call-forwarding acknowledgement message to the ringback server. In at least this manner, a ringback session will be established, and the ringback server may then play ringback media, such as video ringback or music ringback for instance, to the calling party.

In another respect, an exemplary embodiment of the invention may take the form of a system operable to facilitate setup of a ringback session. Such a system may be embodied as a CSCF. Further, the system may include (i) a network communication interface for sending and receiving IP communications including SIP signaling messages on a packet-switched network, (ii) a processor (i.e., one or more processors defining "a processor"), (iii) data storage, and (iv) program logic stored in the data storage and executable by the processor to carry out various functions as described herein.

Preferably, the program logic would be executable, upon receipt via the network communication interface of a SIP INVITE message seeking to set up a call from a first cellular wireless communication device to a second cellular wireless communication device, to forward the SIP INVITE message via the network communication interface to the second cellular wireless communication device. Further, the program logic would preferably be executable thereafter, upon receipt via the network communication interface of SIP 480 message or SIP 486 message from the second wireless communication device, (a) to make a determination, by querying a Home Subscriber Server (HSS), that the called party has custom ringback service and (ii) responsive to the determination, to send a SIP 181 call-forwarding initiation message to a ringback server to initiate forwarding of the call to the ringback server and setup of a ringback media session between the ringback server and the first cellular wireless communication device. Still further, the program logic may be executable to include within the call-forwarding initiation message an indication of particular media or a particular category of media to be played in the ringback media session to the first cellular wireless communication device.

These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention.

DETAILED DESCRIPTION

Figure 1:
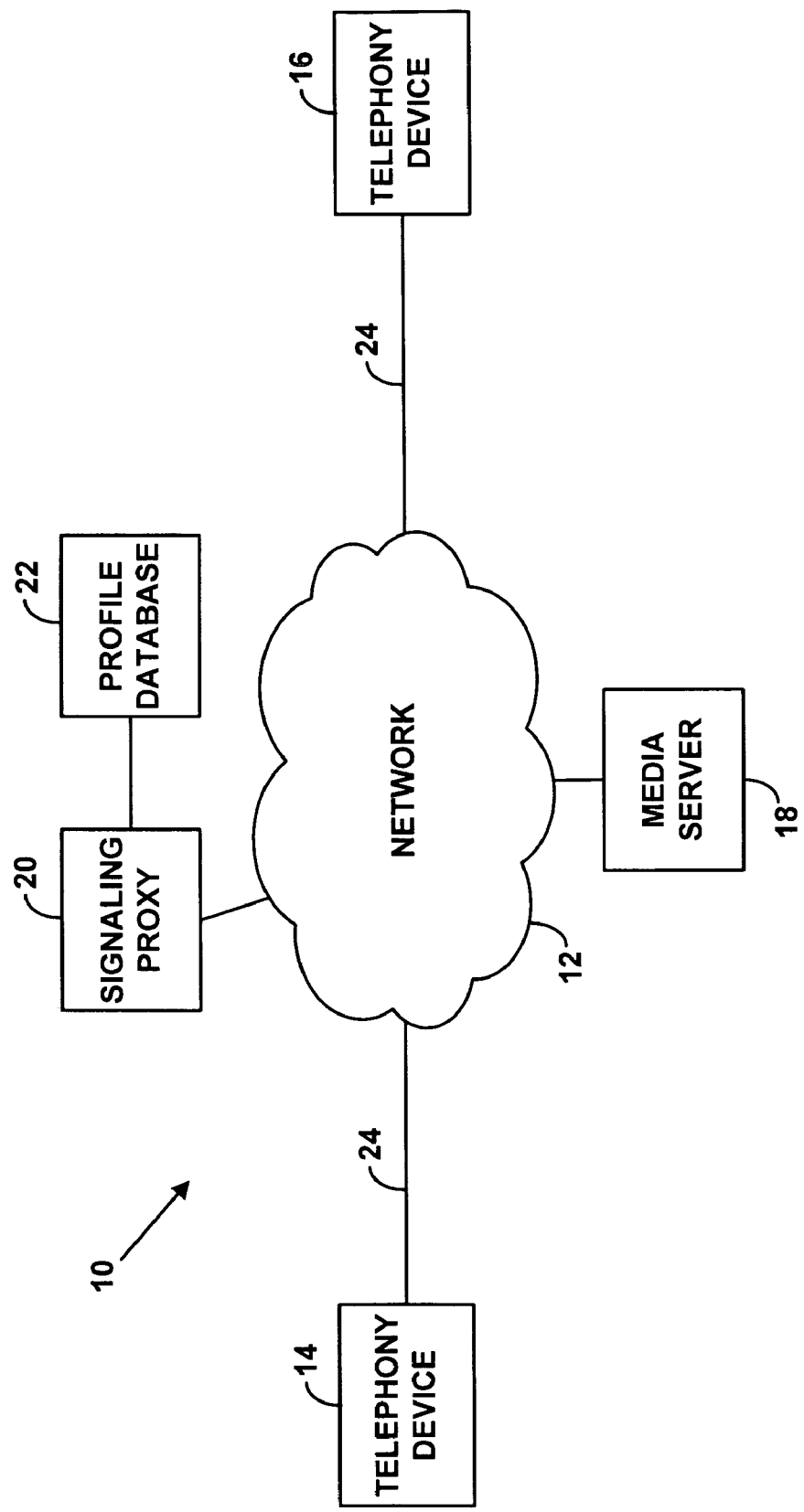
FIG. 1 is a simplified block diagram of a telecommunications system, according to an example of the present invention.

Referring to the drawings, FIG. 1 is a simplified block diagram of a telecommunications system 10, according to an example of the present invention. As shown, the system 10 includes at its core a network 12, which may function to facilitate communication between a plurality of telephony devices (e.g., landline telephones, cellular wireless telephones, fax machines, modems, etc.), such as telephony device 14 and telephony device 16, as well as other various other network entities, including a media server 18. The system 10 also preferably includes a signaling proxy 20 and a profile database 22, as well as other application servers (not shown), which may assist the network 12 in facilitating communication.

It should be understood, however, that this and other arrangements described herein are set forth for purposes of example only. As such, those skilled in the art will appreciate that other arrangements and other elements (e.g., machines, interfaces, functions, orders of functions, etc.) can be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic. For instance, various functions may be carried out by a processor executing a set of machine language instructions stored in memory. Provided with the present disclosure, those skilled in the art can readily prepare appropriate computer instructions to perform such functions.

The network 12 may be, for example, a packet-switched network (e.g., the Internet), a circuit-switched network (e.g., public switched telephone network (PSTN)), and/or a signaling network (e.g., a Signaling System #7 (SS7) network with an Advanced Intelligent Network (AIN) approach). In a preferred example, however, the network 12 will comprise a packet-switched network that facilitates packet-based communication.

The packet-switched network 12 may include one or more local area networks (LANs) and/or one or more wide area networks (WANs), such as the Internet. The packet-switched network 12 may route packets based on network addresses, such as by using the Internet Protocol (IP) protocol in combination with the User Datagram Protocol (UDP) or Transmission Control Protocol (TCP). Further, the packet-switched network 12 may carry IP packets over lower level protocols, such as asynchronous transfer mode (ATM) protocols, and the packet-switched network 12 may carry voice and other media in a real-time packet format, such as by using the real-time transport protocol (RTP). The packet-switched network 12 may also carry signaling messages, such as Session Initiation Protocol (SIP) signaling messages, which the system 10 uses to set up and/or manage communication sessions through the packet-switched network 12. Voice, data, and/or other media may be exchanged in such communication sessions. SIP and/or other protocols may, in turn, use the Session Description Protocol (SDP) to describe the communication sessions that are being set up or managed.

As shown in FIG. 1, the telephony devices may communicatively couple to the packet-switched network 12 via links 24. One or more of the telephony devices may be packet-based telephony devices that are equipped to engage in Voice over Internet Protocol (VoIP) communication, and/or one or more of the telephony devices may be legacy circuit-switched telephony devices that are not equipped to engage in VoIP communication. In turn, the links 24 between the telephony devices and the packet-switched network 12 may vary depending on the type of telephony devices. For example, if one of the telephony devices is a cell phone, the link 24 may include a radio access network (RAN) with a base transceiver station (BTS), a base station controller (BSC), and a packet data serving node (PDSN). Alternatively or additionally, if one of the telephony devices is a circuit-switched device lacking VoIP capability, the link 24 may include a switch (e.g., a mobile switching center (MSC) or service switching point (SSP)) and a media gateway or media terminal adaptor to facilitate communication between the circuit-switched device and the packet-switched network 12. Other examples of links 24 are possible as well. With this general arrangement, telephony devices, such as telephony device 14 and telephony device 16, may engage in packet-based communications (e.g., packet-based telephony) with one another over a path that includes the packet-switched network 12 and the links 24.

The media server 18, which is communicatively coupled to the packet-switched network 12, may function to store media files. The media files that the media server 18 stores may include, for example, audio files (e.g., voices, songs, etc.), image files (e.g., pictures, newspaper articles, greeting cards, etc.), and/or video files (e.g., movies, TV shows, etc.). The media server 18 may store the media files individually, or may store the media files in groupings based on shared characteristics of the media files. Further, the media server 18 may designate some media files as ringback media if those files may be used in ringback media sessions with network entities.

The media server 18 may also function to provide the stored media to network entities, such as telephony device 14 and telephony device 16, over the packet-switched network 12. For example, the media server 18 may receive a request for media from one of the telephony devices or another entity communicating on behalf of one of the telephony devices (e.g., the signaling proxy 20), and the media server 18 may then responsively provide the requesting telephony device with media that satisfies that request. Alternatively, the media server 18 may provide media to one of the telephony devices in response to some other event (e.g., based on a schedule). In either case, the media server 18 may provide the media to the telephony device by streaming the media over the packet-switched network 12 and the link 24, or the media server 18 may provide the media to the telephony device by sending the media data file to the telephony device via the packet-switched network 12 and the link 24.

Any signaling messages carried by the packet-switched network 12 may pass through the signaling proxy 20, which is communicatively coupled to the packet switched network 12. The signaling proxy 20 may then operate on or in response to the signaling messages in order to provide or facilitate various services. For example, after receiving a signaling message, the signaling proxy 20 may itself apply enhanced services or functions, such as call forwarding. As another example, after receiving a signaling message, the signaling proxy 20 may function to shunt the signaling message out to an application server that is arranged to carry out enhanced services or functions. Other examples are possible as well.

Before operating on or in response to signaling messages, the signaling proxy 20 may consult the calling and/or called party's service profile data (e.g., permissions and preferences regarding network services such as applications, media, ringback, etc.). The service profile data for subscribers of the system 10 may be maintained by the signaling proxy 20 itself, or may alternatively be maintained by the profile database 22 that is communicatively coupled to the signaling proxy 20 (either directly or via the packet-switched network 12).

The system 10 may also include additional signaling proxies (not shown) and/or profile databases (not shown). For example, the system 10 may include one or more originating signaling proxies that serve calling parties, and one or more terminating signaling proxies that serve called parties. Further, for each additional signaling proxy, the system 10 may include an additional profile database. Of course, other examples are possible as well.

Figure 2:
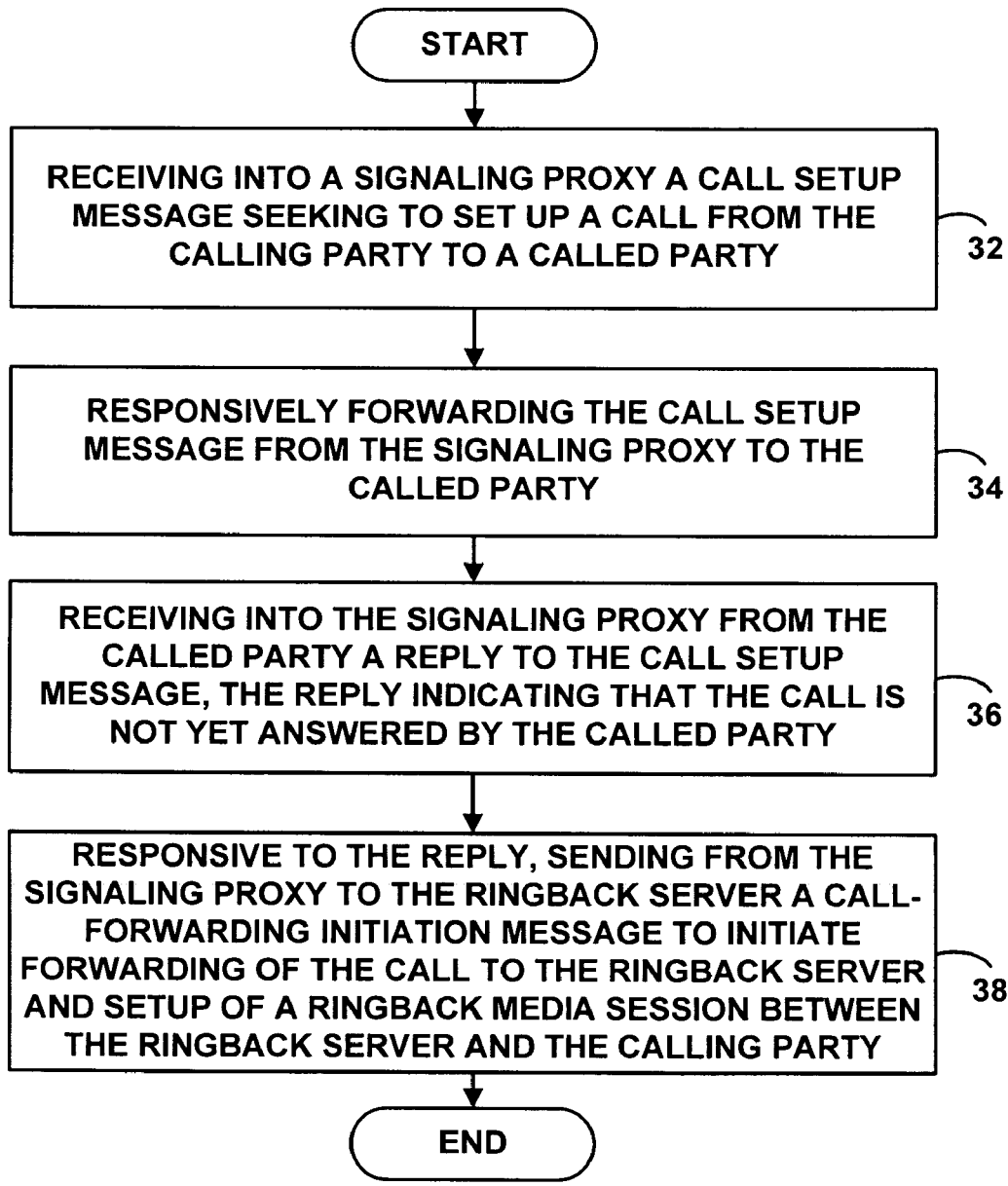
FIG. 2 is a flow chart depicting a method for setting up a ringback media session in the system of FIG. 1, according to an example of the present invention.

FIG. 2 is a flow chart depicting a method for setting up a ringback media session in system 10, according to an example of the present invention. For purposes of illustration, the following description will assume that the ringback media session occurs during setup of a call between the calling telephony device 14 (associated with a calling subscriber) and the called telephony device 16 (associated with a called subscriber).

At step 32, the signaling proxy 20 receives a call setup message from telephony device 14 seeking to set up a call with telephony device 16. In response, at step 34, the signaling proxy 20 forwards the call setup message from the telephony device 14 to the telephony device 16.

Thereafter, at step 36, the signaling proxy 20 receives a reply from telephony device 16, indicating that the telephony device 16 has not yet accepted the call. For example, the reply may indicate that the telephony device 16 is ringing, busy, or temporarily unavailable.

In response to this reply, at step 38, the signaling proxy 20 sends a call-forwarding initiation message to the media server 18 to initiate (i) forwarding of the call to the media server 18 and (ii) setup of a ringback media session between the media server 18 and the telephony device 14. As one example, the signaling proxy 20 may send the call-forwarding initiation message to the media server 18 without first querying subscriber profile data. As another example, the signaling proxy 20 may send the call-forwarding initiation message to the media server 18 only after querying subscriber profile data (e.g., on the profile database 22) to determine whether to initiate forwarding of the call to the media server 18. In making this determination, the signaling proxy 20 may rely on profile data for the calling subscriber and/or the called subscriber.

The signaling proxy 20 may generate the call-forwarding initiation message based on information received in the call setup message at step 32. Further, the call-forwarding initiation message preferably includes at least one parameter that requests the media server 18 to initiate ringback media playout. Further yet, the call-forwarding initiation message may include a specification of particular media (or category of media) that should be provided to the calling telephony device 14, such as a specific song, picture, movie clip, etc. In one respect, that specified media may depend upon the identity of the calling and/or called subscriber, and the signaling proxy 20 may query subscriber profile data (e.g., on the profile database 22) to determine the specified media before generating and sending the call-forwarding initiation message at step 38.

After sending the call-forwarding initiation message to the media server 18 at step 38, the signaling proxy 20 may also continue the setup of the ringback media session by (i) receiving a call-forwarding reply message from the media server 18 and responsively passing the call-forwarding reply message to the calling telephony device 14, and (ii) receiving a call-forwarding acknowledgement message from the calling telephony device 14 and responsively forwarding the call-forwarding acknowledgement message to the media server 18. Thereafter, the media server 18 may provide the ringback media to the calling telephony device 14.

Figure 3:
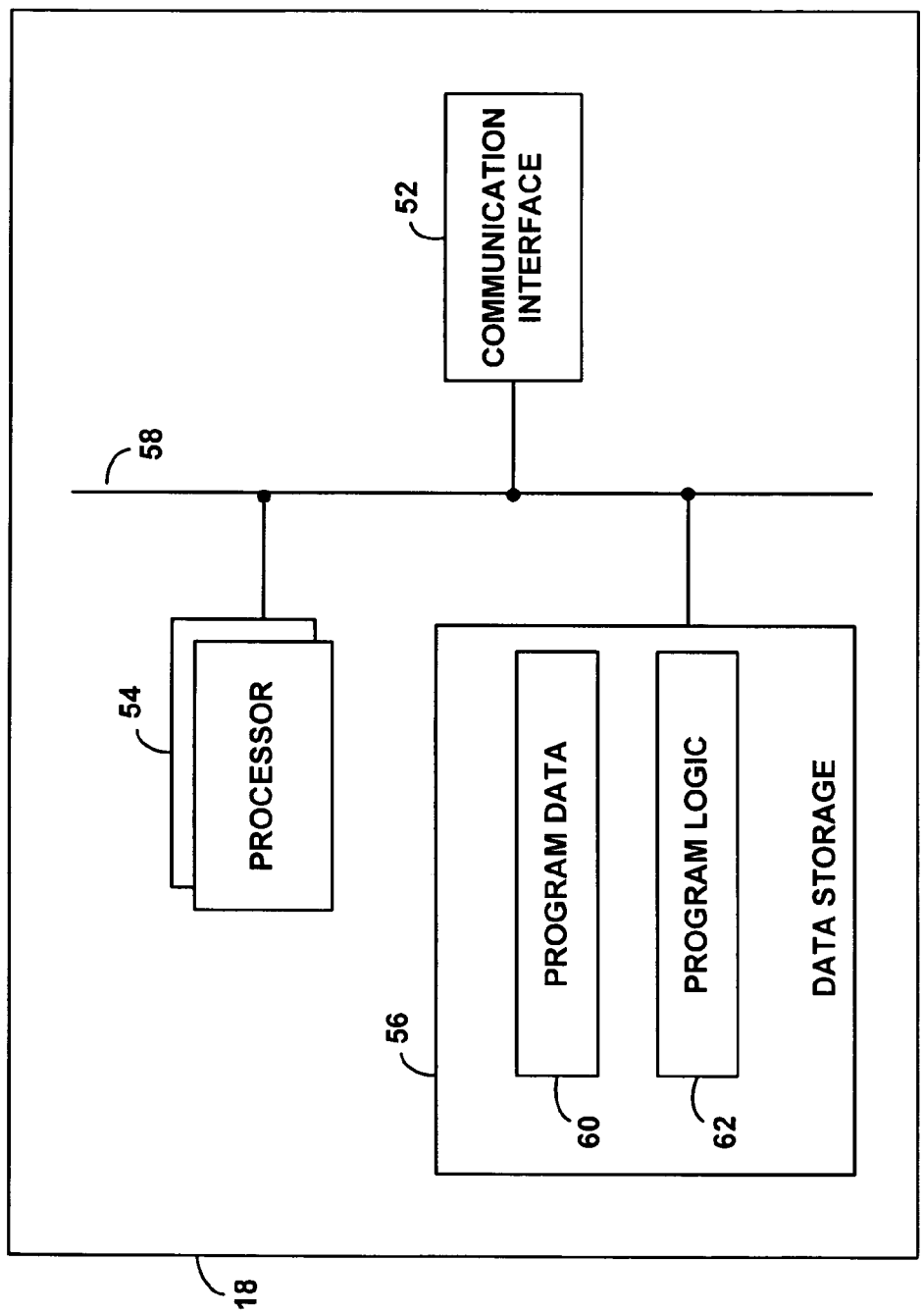
FIG. 3 is a simplified block diagram of a signaling proxy of FIG. 1, according to an example of the present invention.

The functionality of the present invention may be implemented in one or more entities of the system 10. In a preferred example, the signaling proxy 20 may carry out the functions of the present invention. Accordingly, FIG. 3 is a simplified block diagram of the signaling proxy 20 of FIG. 1, showing functional components that can operate to carry out aspect of the present invention. As shown in FIG. 3, the exemplary signaling proxy 20 includes, without limitation, a communication interface 52, a processor 54, and data storage 56, all interconnected by a system bus or other connection mechanism 58.

The communication interface 52 preferably functions to communicatively couple the signaling proxy 20 with the packet-switched network 12. Additionally, the communication interface 52 may also function to communicatively couple the signaling proxy 20 with the profile database 22, the media server 18, and/or other entities in the system 10. As such, the communication interface 52 may take the form of an Ethernet network interface card, or the communication interface 52 may take other forms that provide for wireless and/or wired communication on a network. The signaling proxy 20 may also include multiple communication interfaces 52, such as one through which the signaling proxy 20 sends signaling messages, and one through which the signaling proxy 20 receives signaling messages.

The processor 54 may comprise one or more general purpose microprocessors and/or dedicated signal processors. (The term "processor" encompasses either a single processor or multiple processors that could work in combination.) Data storage 56, in turn, may comprise memory and/or other storage components, such as optical, magnetic, organic or other memory or disc storage, which can be integrated in whole or in part with the processor 54. Data storage 56 preferably contains or is arranged to contain (i) program data 60 and (ii) program logic 62. Although these components are described herein as separate data storage elements, the elements could just as well be physically integrated together or distributed in various other ways. In a preferred example, the program data 60 would be maintained in data storage 56 separate from the program logic 62, for easy updating and reference by the program logic 62.

Program data 60 may contain data relating to signaling messages passing through or generated in the signaling proxy 20. For example, program data 60 may contain an indication of the type of a signaling message (e.g., SIP INVITE, SIP 200 OK, SIP ACK, etc.) and an identifier of the telephony devices exchanging the signaling message (e.g., Mobile Identification Number (MIN), International Mobile Station Identifier (IMSI), etc.). Additionally, program data 60 may contain the contents of a signaling message. Program data 60 may contain other information relating to signaling messages as well.

Program data 60 may also contain information relating to subscribers of the system 10, either temporarily or on a more permanent basis. For example, if the signaling proxy 20 is communicatively coupled the profile database 22, the program data 60 may contain only temporary information relating to the subscribers, which the signaling proxy 20 may obtain from the profile database 22 on an as-needed basis. Alternatively, the program data 60 may contain more permanent information relating to the subscribers of the system 10. In either case, the program data 60 may contain, for example, an identifier of subscribers of the system 10 (e.g., name, telephone number, social security number, etc.), an identifier of the telephony devices associated with subscribers (e.g., MIN, IMSI, etc.), an indication of the type of telephony devices associated with subscribers, and/or service profile data indicating subscribers' permissions and preferences regarding network services (e.g., applications, media, ringback, etc.).

Program logic 62 preferably comprises machine language instructions that are executed or interpreted by processor 54 to carry out functions according to examples of the present invention. It should be understood, however, that the program logic and its associated functions are described herein by way of example only. As such, those skilled in the art will appreciate that other program logic and/or functions may be used instead, some program logic and/or functions may be added, and some program logic and/or functions may be omitted altogether. Further, the various functions described herein can be embodied in software, hardware, and/or firmware.

For example, program logic 62 may be executable by the processor 54 to receive, via the network 12 and the communication interface 52, a signaling message seeking to set up a call from the telephony device 14 (i.e., the calling party) to the telephony device 16 (i.e., the called party). In turn, program logic 62 may be executable by the processor 54 to forward the signaling message, via the communication interface 52 and the network 12, to the telephony device 16. Additionally, program logic 62 may be executable by the processor 54 to store information relating to the received signaling message in data storage 56 as program data 60.

Thereafter, if the signaling proxy 20 receives, via the network 12 and the communication interface 52, a reply from the telephony device 16 indicating that the telephony device 16 has not accepted the call, program logic 62 may be executable by the processor 54 to determine whether the parties to the call are eligible for ringback media service, based on the parties' service profile data (e.g., permissions and/or preferences for ringback media service). In a preferred example, program logic 62 may first obtain the parties' service profile data by querying the profile database 22 and then temporarily storing the service profile data in data storage 56 as program data 60.

Program logic 62 may also be executable by the processor 54 to generate and send, via the communication interface 52 and the network 12, a call-forwarding initiation message to the media server 18 to initiate (i) forwarding of the call to the media server 18 and (ii) setup of a ringback media session between the media server 18 and the telephony device 14. Program logic 62 may carry out this function in response to receiving the reply indicating that the telephony device 16 has not accepted the call, or in response to determining whether the parties to the call are eligible for ringback media services.

Additionally, program logic 62 may be executable by the processor 54 to include within the call-forwarding initiation message (i) at least one parameter that requests the media server 18 to initiate ringback media playout, and/or (ii) an indication of particular media or a particular category of media to be played in the ringback media session to the telephony device 14.

Additionally yet, program logic 62 may be executable by the processor 54 to (i) pass a call forwarding reply message received from the media server 18 to the telephony device 14 via the communication interface 52 and the network 12, and (ii) pass a call-forwarding acknowledgement message received from the telephony device 14 to the media server 18 via the communication interface 52 and the network 12.

Figure 4:
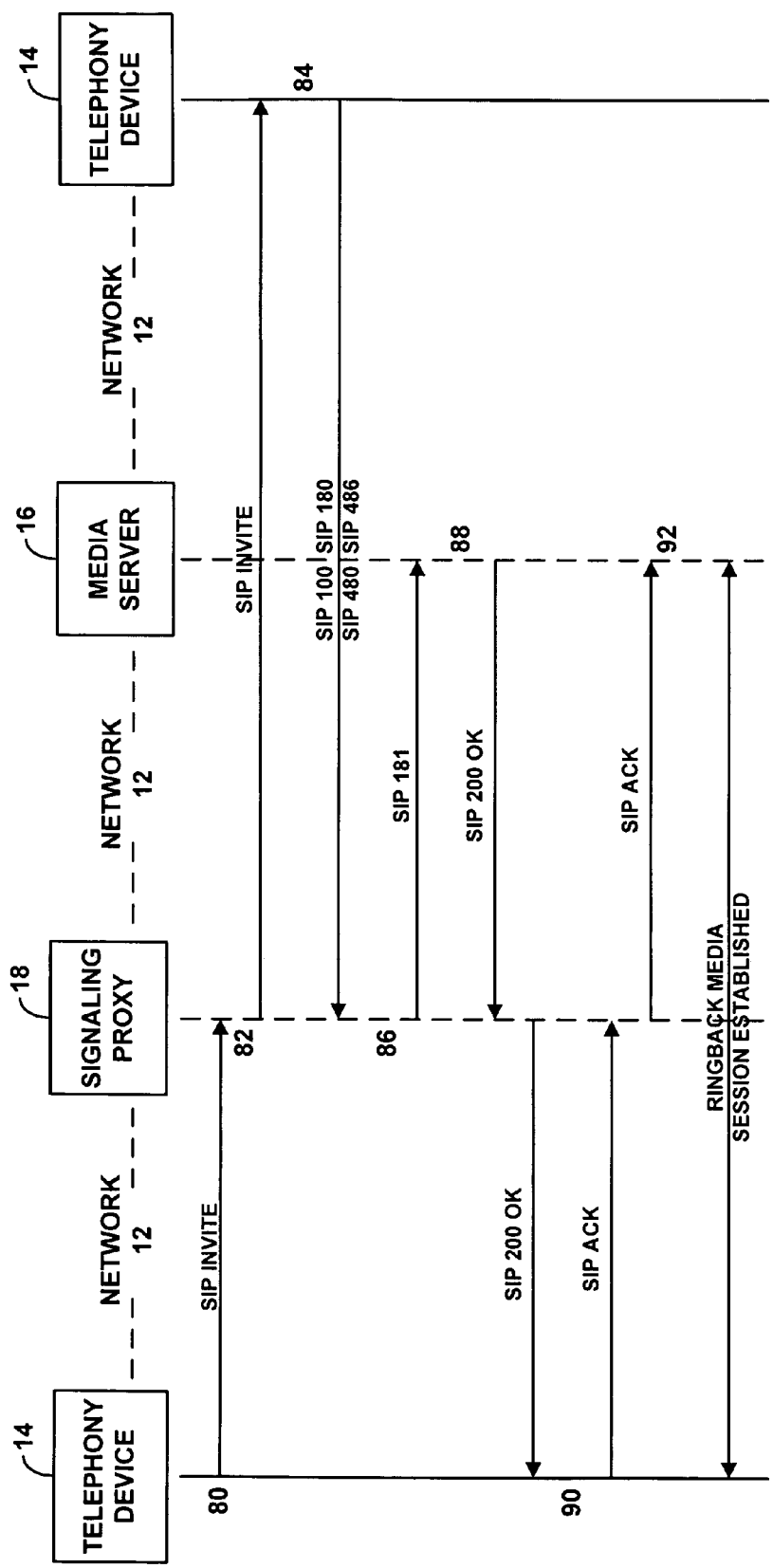
FIG. 4 illustrates a signaling message flow diagram for setting up a call in the system of FIG. 1, according to an example of the present invention.

FIG. 4 illustrates a signaling message flow diagram for setting up a call in the system 10, according to an example of the present invention. For purposes of illustration, the system 10 will use SIP messaging and IMS to set up a VoIP call between a calling VoIP-capable cell phone 14 and a called VoIP-capable cell phone 16. As such, signaling proxy 20 will comprise an IMS CSCF, and the profile database 22 will comprise an IMS HSS.

The process may begin when a calling subscriber dials a telephone number of a called subscriber on the calling cell phone 14. In response, at step 80, the calling cell phone 14 may attempt to set up a call with the called cell phone 16 by transmitting a SIP INVITE into the packet-switched network 12. Thereafter, at step 82, the CSCF 20 on the packet-switched network 12 may receive the SIP INVITE, store information relating to the SIP INVITE as program data 60 in data storage 56, and responsively forward the SIP INVITE (via the packet-switched network 12) to the called cell phone 16.

At step 84, the called cell phone 16 may receive the SIP INVITE. In turn, the called cell phone 16 may send a reply into the packet-switched network 12 indicating the status of the call. For example, the called cell phone 16 may send a message indicating acceptance of the call (e.g., SIP 200 OK message), or the called cell phone 16 may send a message indicating that the called subscriber has not accepted the call (e.g., a SIP 480 "temporarily unavailable" message, a SIP 486 "busy here" message, a SIP 100 "trying message", or a SIP 180 "ringing" message).

At step 86, if the CSCF 20 receives any reply message from the called cell phone 16 indicating that the called subscriber has not accepted the call, the CSCF 20 may responsively generate and send a SIP 181 "call-forwarding initiation" message to the media server 18. However, prior to generating and sending that SIP 181 message, the CSCF 20 may first determine whether the calling subscriber and/or called subscriber are eligible for ringback media service, based on the subscribers' service profile data. In a preferred example, the CSCF 20 may obtain the service profile data by querying the HSS 22.

The CSCF 20 may generate the SIP 181 message based on the SIP INVITE message received at step 82. For example, the CSCF 20 may convert the SIP INVITE message (which the CSCF 20 may have previously stored as program data 60) into the SIP 181 message. Alternatively, the CSCF 20 may generate the SIP 181 based on information contained in the SIP INVITE message, which the CSCF 20 may have stored as program data 60. The CSCF 20 may also include in the generated SIP 181 a SDP header parameter that directs the media server 18 to initiate playout of ringback media. Further yet, the CSCF 20 may include in the generated SIP 181 a designation of particular media or category of media (e.g., by media-ID) that should be provided to the calling cell phone 14 (e.g., a specific song, picture, movie clip, etc.). In a preferred example, that designation of particular media or category of media will be based on service profile data obtained from the IMS HSS 22.

Anytime after the CSCF generates and sends the SIP 181 message to the media server 18 step 86, the CSCF 20 may also begin working with a PDSN serving either cell phone 14 to (i) ensure the availability of sufficient bandwidth for the ringback media session and then (ii) reserve sufficient bandwidth for the ringback media session At step 88, the media server 18 may receive the SIP 181 and then responsively accept the call-forwarding initiation request by sending a SIP 200 OK message through the CSCF 20 to the calling cell phone 14. In addition, at step 88, the media server 18 may read the media designation in the SIP 181 message and thereby determine what media to provide to the calling cell phone 14 as ringback once the ringback media session begins.

At step 90, the calling cell phone 14 may receive the SIP 200 OK message and responsively send a SIP ACK message through the CSCF 20 to the media server 18 to complete setup of the ringback media session. Finally, at step 92, the media server 18 may receive the SIP ACK message and the ringback media session will begin.

It should be understood that the present invention is focused principally on establishing, or facilitating establishment of, a ringback media session between media server 18 and a calling cell phone 14. As such, the invention may or may not further involve the actual communication of the ringback media or other procedures that may be applied to discontinue provision of the ringback media if and when the called subscriber (or voice mail or other entity acting on behalf of the called subscriber) accepts the call. As an extension, in that regard, when the called subscriber (or other entity) answers the call, a SIP signaling message may pass back to the CSCF 20, and the CSCF 20 may responsively (i) signal to the media server 18 to discontinue the ringback media session between the media server 18 and the calling cell phone 14 and (ii) proxy further session setup signaling, such as a SIP 200 OK message and a SIP ACK message, between the calling and called cell phones 14, so as to complete setup of the originally requested call. Thereafter, the subscribers may then communicate with each other.

Exemplary embodiments of the present invention have been described above. Those skilled in the art will understand, however, that changes and modifications may be made to the embodiments described without departing from the true scope and spirit of the present invention, which is defined by the claims.

I claim:

1. A method of setting up a ringback session between a ringback server and a calling party, the method comprising:
receiving into a signaling proxy a call setup message seeking to set up a call from the calling party to a called party;

responsively forwarding the call setup message from the signaling proxy to the called party;

thereafter receiving into the signaling proxy from the called party a reply to the call setup message, the reply indicating that the call is not yet answered by the called party; and responsive to receiving the reply, sending from the signaling proxy to the ringback server a call-forwarding initiation message that initiates forwarding of the call to the ringback server and setup of a ringback media session between the ringback server and the calling party.

2. The method of claim 1, wherein the signaling proxy comprises an Internet Protocol Multimedia System (IMS) Call Session Control Function (CSCF).

3. The method of claim 2, wherein the calling party comprises a first wireless communication device and the called party comprises a second wireless communication device.

4. The method of claim 3, wherein the first wireless communication device comprises a first cellular telephone, and the second wireless communication device comprises a second cellular telephone.

5. The method of claim 3, further comprising:
communicating between the CSCF and a Packet Data Serving Node (PDSN) serving the calling party to reserve bandwidth for delivery of ringback media to the calling party.

6. The method of claim 2, wherein the call setup message comprises a Session Initiation Protocol (SIP) INVITE message.

7. The method of claim 6, wherein the reply message comprises a SIP 480 message indicating that the called party is temporarily unavailable or a SIP 486 message indicating that the called party is busy.

8. The method of claim 7, wherein the call-forwarding initiation message comprises a SIP 181 call forwarding message.

9. The method of claim 8, wherein the call-forwarding initiation message includes at least one parameter that requests the ringback server to initiate ringback playout.

10. The method of claim 9, wherein the call-forwarding initiation message specifies at least one of particular media and a particular category of media to play to the calling party.

11. The method of claim 10, further comprising:
querying subscriber profile data to determine at least one of the particular media and the particular category of media, based on at least one of an identity of the calling party and an identity of the called party;

and then specifying the determined particular media or particular category of media in the call-forwarding initiation message.

12. The method of claim 1, further comprising:
querying subscriber profile data to make a determination of whether to initiate forwarding of the call to the ringback server, and sending the call-forwarding initiation message to the ringback server only if the determination is to initiate forwarding of the call to the ringback server.

13. The method of claim 12, wherein the determination is based upon calling party profile data in the subscriber profile data.

14. The method of claim 12, wherein the determination is based on called party profile data in the subscriber profile data.

15. The method of claim 1, further comprising, after sending the call-forwarding initiation message to the ringback server:

receiving into the signaling proxy from the ringback server a call-forwarding reply message, and passing the call-forwarding reply message from the signaling proxy along to the calling party; and thereafter receiving into the signaling proxy from the calling party a call-forwarding acknowledgement message, and passing the call-forwarding acknowledgement message to the ringback server, whereby, the ringback server then plays ringback media to the calling party.

16. The method of claim 15, wherein the ringback media comprises video ringback.

17. The method of claim 15, wherein the ringback media comprises music ringback.

18. A system operable to facilitate setup of a ringback session, the system comprising:

a network communication interface for sending and receiving Internet Protocol (IP) communications including Session Initiation Protocol (SIP) signaling messages on a packet-switched network;

a processor;

data storage; and program logic stored in the data storage and executable by the processor, to carry out functions comprising:

(a) upon receipt via the network communication interface of a SIP INVITE message seeking to set up a call from a first cellular wireless communication device to a second cellular wireless communication device, forwarding the SIP INVITE message via the network communication interface to the second cellular wireless communication device, (b) thereafter, upon receipt via the network communication interface of a SIP 480 message or a SIP 486 message from the second wireless communication device, (i) making a determination, by querying a Home Subscriber Server (HSS), that the second cellular wireless communication device has custom ringback service and (ii) responsive to the determination, sending a SIP 181 call-forwarding initiation message to a ringback server that initiates forwarding of the call to the ringback server and setup of a ringback media session between the ringback server and the first cellular wireless communication device.

19. The system of claim 18, embodied in an Internet Protocol Multimedia System (IMS) Call Session Control Function (CSCF).

20. The system of claim 18, wherein the program logic is executable by the processor to include within the call-forwarding initiation message an indication of particular media or a particular category of media to be played in the ringback media session to the first cellular wireless communication device.

* * * * *